United States Patent [19]

Piana

[11] 3,954,126

[45] May 4, 1976

[54] AUTOMATIC DISPENSER FOR THE MANUFACTURE OF ICE CREAM IN VARIOUS SINGLE OR MIXED FLAVOURS AND DISPENSING IN CUPS AND/OR WAFER CONES

[75] Inventor: Giuseppe Stefano Piana, Milan, Italy

[73] Assignee: Piana S.p.A., Milan, Italy

[22] Filed: Feb. 25, 1974

[21] Appl. No.: 445,338

[30] Foreign Application Priority Data

Feb. 23, 1973 Italy.................................. 20758/73

[52] U.S. Cl................................. 141/48; 141/49; 141/100; 141/174
[51] Int. Cl.² ........................................ B65B 31/00
[58] Field of Search ........................... 141/100–105, 129–191, 82, 369–375, 48, 49, 54, 56, 63, 64, 99; 259/2–10

[56] References Cited
UNITED STATES PATENTS 2,580,257   12/1951   Tacchella............................ 141/174

Primary Examiner—Houston S. Bell, Jr.
Attorney, Agent, or Firm—Browdy and Neimark

[57] ABSTRACT

An automatic dispenser for ice cream in cups and/or wafer cones, comprising one or more containers for ice cream ingredients, a first compressor for supplying cold compressed air at a predetermined pressure to the said containers and to one or more holding and mixing chambers, a second compressor group supplying a cooling gas for cooling the surfaces of the said containers and to an outer chamber containing the said containers and being provided with a fan, an ice cream dispensing and a cup and/or cone dispensing device, a positioner for the cups and/or cones associated with a dosing device, a programmer for controlling the sequence of dispensing operation, and disactivation of the operation cycle when the cups and/or cones have received the predetermined quantity of ice cream.

9 Claims, 4 Drawing Figures

AUTOMATIC DISPENSER FOR THE MANUFACTURE OF ICE CREAM IN VARIOUS SINGLE OR MIXED FLAVOURS AND DISPENSING IN CUPS AND/OR WAFER CONES

BACKGROUND OF THE INVENTION

The present invention relates in general to an automatic ice cream dispenser, preparing and dispensing ice cream in various single or mixed flavors in cups and/or wafer cones.

Such a dispenser, when introducing a coin, automatically positions a cup or cone to receive a predetermined quantity of ice cream, which may be of any flavor, single or blended, and to dispense it. The consumer, and this avoids one of the main disadvantages of a similar dispenser, does not interfere therewith except by introducing the required coin and select the flavor.

A further advantage of such a dispenser is that the ice cream is prepared only when required and this only in the desired amount.

SUMMARY OF THE INVENTION

The automatic ice cream dispenser according to the present invention using cups or/and wafer cones and supplying various single or mixed flavor ice creams, comprises: one or more containers, which may be movably fixed, for receiving the ice cream base ingredients; a first air compressor group for supplying cold compressed air at a predetermined pressure to the said containers; one or more mixing chambers for mixing the base ingredients with compressed air, each chamber being connected to a second compressor group supplying a cooling gas, for example Freon, for cooling the surface of one or more holding chambers and in addition the surface and inside of a further chamber provided with a fan and forming an outer envelope around the said containers; an ice cream dispensing device; a cup and/or water cone dispensing device; a cup and/or cone positioner stationed near the ice cream dispensing device; a dosing device matched to the said positioner device; a sequence programmer for controlling the operation cycle as follows: activation of the first compressor group and taking up of a predetermined quantity of ice cream ingredients; activation of the second compressor group for feeding the said ingredients into the holding and mixing chambers and for feeding in cooling gas; activation of the driving means of the said holding and mixing chambers and transportion of the ready ice cream to the dispensing device; activation of the cup and/or wafer cone dispenser and positioner; activation of the dispensing unit which, after dispensing, is disengaged by the dosing device after the said cup or cone has been filled with the predetermined quantity of ice cream.

BRIEF DESCRIPTION OF THE DRAWINGS

The automatic ice cream dispenser of the present invention will be still better understood from the description of a preferred embodiment thereof and from the accompanying drawings, in which.

DESCRIPTION OF THE PREFERRED EMBODIMENTS

Figure 1:
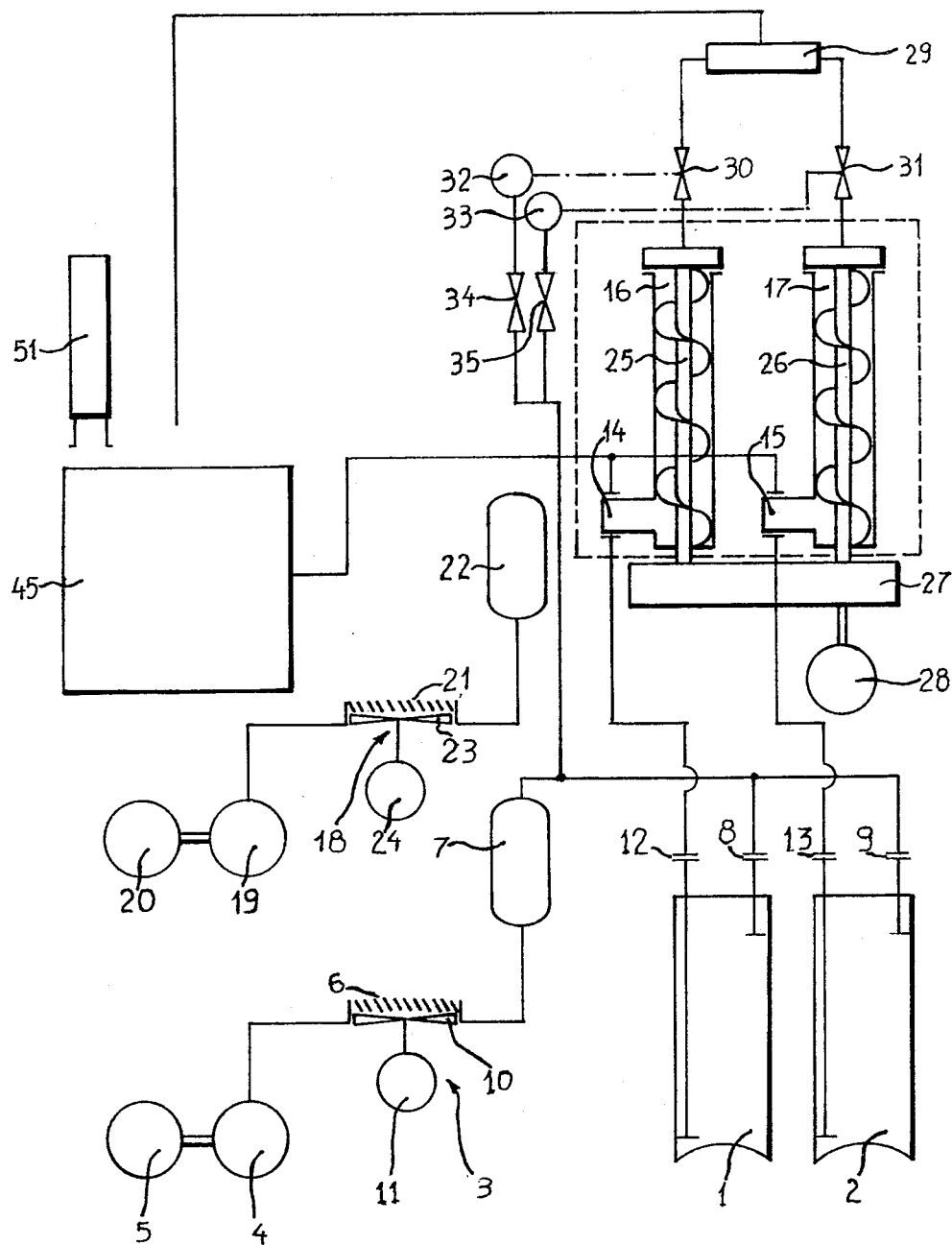
FIG. 1 shows a synoptic scheme of the dispenser according to the preferred embodiment of this invention.

In FIG. 1 we see two ice cream ingredient containers 1 and 2, the said containers being sealed drums for receiving the ice cream ingredients to be kept under vacuum.

The first air-compressor group 3 is of known type and comprises a pump 4 driven by a motor 5 and is connected through a heat exchanger 6 circulating the cooling gas mentioned hereinbelow, to the compressed air tank 7.

The tank 7 is connected by electrovalves 8, 9 respectively to the containers 1 and 2.

The heat exchanger 6 is fitted in addition with a cooling fan 10 driven by a motor 11.

The first compressor group 3 thus supplies cold compressed air to the containers 1, 2. These containers 1, 2 are then connected by the electrovalves 12, 13 to the mixing chambers, respectively 14, 15, for mixing the air with the ice cream ingredients, and connected to the holding and beating chambers 16, 17.

These holding chambers 16, 17 are connected to a second compressor group 18 of the known type, comprising a pump 19 driven by a motor 20, and connected through a heat exchanger 21 with the tank 22 containing a cooling gas, for example, Freon.

The said holding chambers 16, 17 and the compressor group 18 are connected by coils (not shown) in contact with the surface of the said chambers and filled with a coolant gas, the same gas which passes also through the heat exchanger 6. The heat exchanger 21 is combined with a coolant fan 23 driven by the motor 24.

The holding chambers 16, 17, which are of known type, contain at the inside a scroll 25, 26, respectively, the shafts of which are linked to the kinematic transmission system 27, of known type, driven by the motor 28. The transmission system is in general a belt-pulley one.

The holding chambers 16, 17 are still further connected to a dispensing unit 29 of the type normally used for ice cream dispensers, with the outlet ducts provided with valves 30, 31 controlling the dispensing of the ice cream.

The said valves 30, 31 are mechanically connected to the drive elements 32, 33 controlled through electrovalves 34, 35 connected in turn with the tank 7 of the first compressor unit 3.

Figure 2:
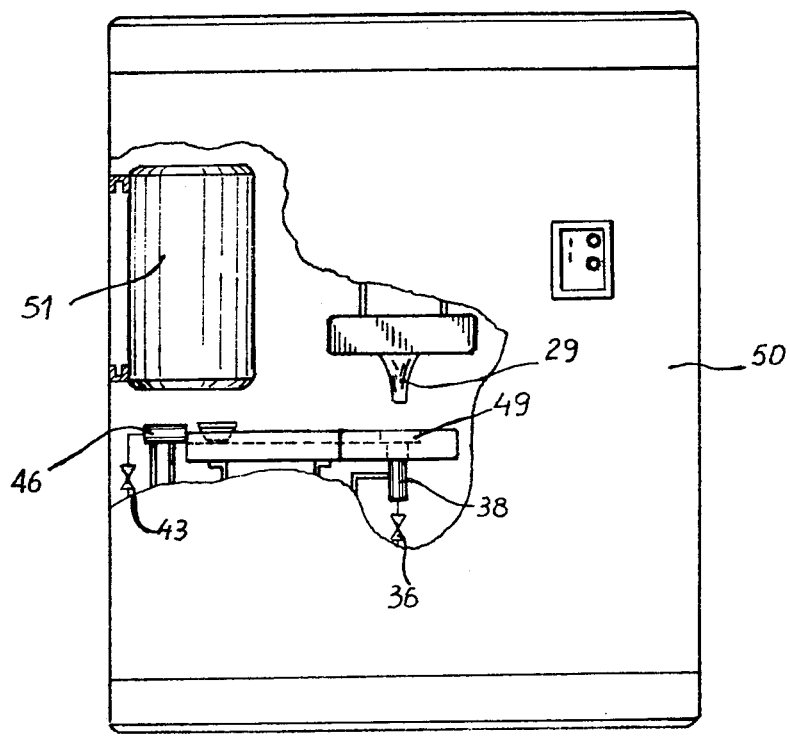
FIG. 2 is a plan view of the cup positioner of the said dispenser.
Figure 3:
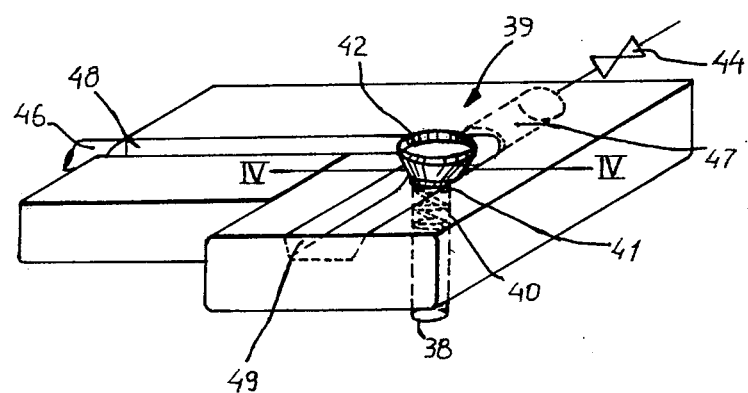
FIG. 3 is a side view of the cup positioner of the said dispenser, with FIG. 4 giving a close-up section along the line IV—IV of FIG. 3.
Figure 4:
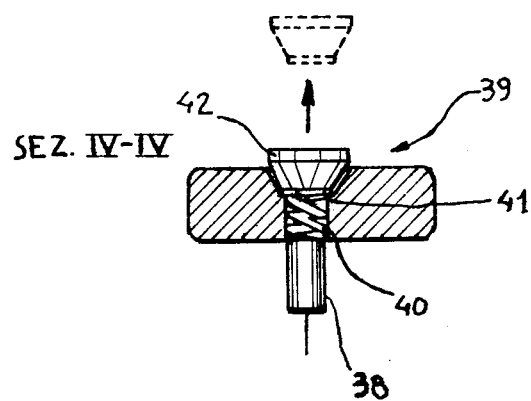

The compressed air tank 7 is also connected through the electrovalves 36, 37 and 43, 44, with a cup positioner 45 shown in FIG. 1 and in detail in FIGS. 2, 3, and 4, consisting of a piston 38 seated underneath a doser 39, the said doser 39 comprising a spring 40 resting with the lower end on the piston 38 and carrying at the upper end a support 41 for the cup 42. A microswitch (not shown) is provided in the lower part of the spring 40 and engages, when excited, the electrovalve 36 connected to the piston 38. The piston then lifts the cup to the dispensing unit.

The said dispensing unit comprises two further pistons 46, 47, operated by the respective electrovalves 43, 44; the said pitons move perpendicular one to the other and control the motion of the support 41 carrying the cup 42 within the guides 48, 49, too at 90° one to the other.

As shown in the drawings, the cup 42, when filled, is carried by automatic means to the outlet of the dispenser - the dispenser wall being indicated by 50.

51 is a known cup dispenser unit (FIG. 1).

Finally, the dispenser of this invention comprises a multi-cam type programmer, each cam being designed to engage successively a microswitch for the progressive excitation of the single dispenser components resulting of the dispensing of a predetermined amount of ice cream.

This programmer is known as such and may be, for example, a control device formed of a plurality of cylindrical cams keyed in staggered form to a single rotating shaft.

This progressive activation will be still better understood from the following description of the operation of a dispenser according to the present invention.

The first unit to be engaged is the first compressor group ensuring the taking-up of a predetermined amount of ice cream ingredients from the containers 1, 2, and is followed by the activation of the second compressor group 18 feeding cooling gas to the holding chambers 16 and/or 17.

This step is followed by the activation of the chambers 27, 28 and means controlling the feed of the ice cream to the dispenser output 29.

At this point, the cup dispenser and/or cone dispenser as well as the ice cream output device 29 are engaged, the operation of the latter being again interrupted, when the doser 39, after having reached the predetermined weight, closes again its microswitch.

The cup 42 is then moved as required by the piston 38 and the pistons 46, 47, driven respectively by the electrovalves 36, 43, 44.

All these movements are controlled by a system of photoelectric cells.

The here described automatic ice cream dispenser, according to the present invention, may be made in other embodiments differeing from that outlined; for example, the shape of the positioner and its form and driving means may vary, and also the reciprocal ratio between the holding and mixing chambers may vary, they may also be omitted, all this without leaving the limits of the present invention.

What we claim and desire to secure by Letters Patent is:

1. An automatic dispenser for ice cream of various single or blended flavors, dispensed either in cups or/and wafer cones, comprising one or more moveably fixed containers for ice cream ingredients; a first compressor group for supplying cold compressed air at a predetermined pressure, the said compressor group being connected to one or more ice cream ingredient mixing containers and chambers; a second compressor supplying a cooling gas, for example, Freon, for cooling the surface of one or more containers and chambers and for cooling a further chamber being provided to receive the said containers and fitted with a fan; an ice cream dispensing unit, a cup and/or cone dispensing unit, a positioner for the said cups and/or cones arranged near the ice cream dispensing unit; the said positioner being associated with a dosing device; a programmer for controlling the operation sequence as follows: activation of the first compressor group for feeding a predetermined quantity of ice cream ingredients; activation of the second compressor group for feeding the cooling gas to one or more of the holding chambers; activation of the said holding and mixing chambers for feeding the ice cream to the said dispensing unit; activation of the cup and/or cone dispensing unit and the positioner; the activation of the ice cream dispensing unit and its disactivation being controlled by the doser when the cup or cone have received the predetermined quantity of ice cream.

2. An automatic ice cream dispenser according to claim 1, in which each holding chamber is connected to the ice cream dispensing device by means of a valve possessing proper drive means controlled by the first compressor group.

3. An automatic ice cream dispenser according to claim 1, in which each container is a closed drum sealed off for air removal.

4. An automatic ice cream dispenser according to claim 1, in which the first and the second compressor groups have each a tank containing respectively compressed air and a cooling gas.

5. An automatic ice cream dispenser according to claim 1, in which the positioner is connected through an electrovalve to the first compressor group.

6. An automatic ice cream dispenser according to claim 1, in which the positioner consists substantially of an L-like guide with one arm of the L projecting out of the dispenser, and a first and a second piston controlled by the first compressor group for feeding the cup along the arms of the said L-like guide, and a third piston for controlling the said cup to approach it to the dispensing device.

7. An automatic ice cream dispenser according to claim 1, in which the dosing device is a spring carrying the cup, the said spring being calibrated for a given weight, which, when reached, causes the spring to close a microswitch.

8. An automatic ice cream dispenser according to claim 1, in which the cup or wafer cone is automatically discharged from the machine.

9. An automatic ice cream dispenser according to claim 6, in which the cup or wafer cone is automatically discharged from the machine.

* * * * *